(12) United States Patent
Efstathopoulos et al.

(10) Patent No.: US 9,305,007 B1
(45) Date of Patent: Apr. 5, 2016

(54) DISCOVERING RELATIONSHIPS USING DEDUPLICATION METADATA TO PROVIDE A VALUE-ADDED SERVICE

(71) Applicant: Symantec Corporation, Mountain View, CA (US)

(72) Inventors: Petros Efstathopoulos, Los Angeles, CA (US); Sharada Sundaram, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 110 days.

(21) Appl. No.: 13/763,268

(22) Filed: Feb. 8, 2013

(51) Int. Cl.
*G06F 17/30* (2006.01)

(52) U.S. Cl.
CPC ............... *G06F 17/30156* (2013.01)

(58) Field of Classification Search
CPC .................................................. G06F 17/3015
USPC .......................................................... 707/692
See application file for complete search history.

(56) References Cited

U.S. PATENT DOCUMENTS

| | | | |
|---|---|---|---|
| 2007/0198714 A1* | 8/2007 | Faden | 709/225 |
| 2009/0119395 A1* | 5/2009 | Kodama | 709/223 |
| 2011/0145207 A1* | 6/2011 | Agrawal et al. | 707/692 |
| 2013/0276090 A1* | 10/2013 | Kopti | 726/11 |
| 2014/0114933 A1* | 4/2014 | Chandrasekarasastry et al. | 707/692 |

* cited by examiner

*Primary Examiner* — Grace Park
(74) *Attorney, Agent, or Firm* — William Cutler Pickering Hale and Dorr LLP

(57) ABSTRACT

A first computer system identifies deduplication metadata for files. The deduplication metadata includes block level information for the files. The first computer system determines relationships that are associated with the files based on the block level information and sends relationship data that describes the relationships that are associated with the files to a second computer system via a network.

15 Claims, 6 Drawing Sheets

DISCOVERING RELATIONSHIPS USING DEDUPLICATION METADATA TO PROVIDE A VALUE-ADDED SERVICE

TECHNICAL FIELD

The present disclosure relates to providing a value-added service, and more particularly, to discover relationships using deduplication metadata to provide a value-added service.

BACKGROUND

Some information management platforms provide advanced data discovery and protection services. For example, some Enterprise companies may implement data discovery and protection services to capture as much information regarding Enterprise data as possible in order to better model user behavior in the Enterprise, and then use that model to adjust the security policies and access policies of the Enterprise accordingly. In the context of information protection, it is generally becoming more critical for Enterprises to be able to support detailed information discovery operations, to conduct security audits, or even data forensics analysis operations. Conventional data discovery and protection solutions focus efforts on real-time protection, by directly monitoring user actions, data transfers, and implicit and explicit information flows. However, such traditional online techniques have limits to the amount of information that can be captured and cannot identify co-relations between users and data at the level of detail that is desired by Enterprises. For example, generally, conventional solutions do not provide a time perspective for information flowing through the Enterprise system. A greater granularity in tracking data typically cannot be achieved effectively by traditional online protection tools.

SUMMARY

In one implementation, a system for providing a value-added service based on block-based deduplication metadata is described. An example system may include a first computer system that includes a memory and a processing device that identifies deduplication metadata for files. The deduplication metadata includes block level information for the files. The first computer system determines relationships that are associated with the files based on the block level information and sends relationship data that describes the relationships that are associated with the files to a second computer system via a network.

In one implementation, the first computer system determines the relationships that are associated with the files by identifying files that point to the same data segment. In one implementation, the first computer system further identifies machines that are associated with the files that point to the same data segments, and identifies users that are associated with the machines. In one implementation, the files include a virtual machine image, compressed data, and/or archived data. In one implementation, the first computer system is a data storage backup system. In one implementation, the second computer system is a data loss prevention system, a discovery system, a data governance system, an auditing system, and/or a forensic system. In one implementation, the second computer system identifies a first file that satisfies criterion of a value-added service, identifies a second file that is related to the first file based on the relationship data, and determines that the second file satisfies the criterion of the value-added service based on the second file being related to the first file.

Further, a method for providing a value-added service based on block-based deduplication metadata is described. In one implementation, the method comprises identifying deduplication metadata for files. The deduplication metadata includes block level information for the files. The method includes determining, by a first computer system, relationships that are associated with the files based on the block level information and sending relationship data that describes the relationships that are associated with the files to a second computer system via a network.

The method includes identifying files that are pointing to the same data segment, identifying machines that are associated with the files that point to the same data segments, and identifying users that are associated with the machines. In one implementation, the files include a virtual machine image, compressed data, and/or archived data. In one implementation, the first computer system is a data storage backup system. In one implementation, the second computer system is a data loss prevention system, a discovery system, a data governance system, an auditing system, and/or a forensic system. In one implementation, the second computer system identifies a first file that satisfies criterion of a value-added service, identifies a second file that is related to the first file based on the relationship data, and determines that the second file satisfies the criterion of the value-added service based on the second file being related to the first file.

In addition, a non-transitory computer readable storage medium for providing a value-added service based on block-based deduplication metadata is described. An example non-transitory computer readable storage medium includes instructions that will cause a processing device to perform operations that include identifying deduplication metadata for files. The deduplication metadata includes block level information for the files. The operations include determining, by a first computer system, relationships that are associated with the files based on the block level information and sending relationship data that describes the relationships that are associated with the files to a second computer system via a network.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and system for providing a value-added service based on block-based deduplication metadata, according to various implementations. Data deduplication is a data compression technique for eliminating duplicate copies of redundant data. Various systems can use deduplication to improve system performance. For example, file systems may use data deduplication to improve efficiency. In another example, backup systems can use data deduplication to improve storage utilization. Backup systems can perform data deduplication at the block level, which can provide finer granularity of information than at the file level. For example, in the deduplication process, a backup system can identify unique blocks of data, or byte patterns, and can store a copy of the unique block of data in a data store. As the backup system continues to analyze data for byte patterns, the backup system can compare other blocks of data to the stored blocks of data. When a match occurs, the backup system can replace the redundant block of data with a small reference (e.g. pointer) that points to the corresponding stored block of data. Given that the same byte pattern may occur dozens, hundreds, or even thousands of times, the backup system can greatly reduce the amount of data that must be stored or transferred by using pointers to the copies of the blocks of data. The backup system can create block-based deduplication metadata for the blocks of data. The deduplication metadata is block-based in that the deduplication process occurs at the block level. The block-based deduplication metadata can include unique fingerprints that identify the content of the files. The block-based deduplication metadata can also include information about the individual files, such as the file owner, the machine and/or data store where the file resides, when the file was created, and other information. For brevity and simplicity, a backup system is used as one example of a system that creates block-based deduplication metadata throughout this document.

Implementations of the present disclosure analyze block level information in the deduplication metadata to identify relationships associated with data sets and use the relationship data to provide value-added services. Examples of value-added services can include, and are not limited to, data loss prevention (DLP) services, data governance services, discovery services, forensic services, policy (e.g., security policy, access policy) optimization services, auditing services, data sharing analysis services, etc.

Figure 1:
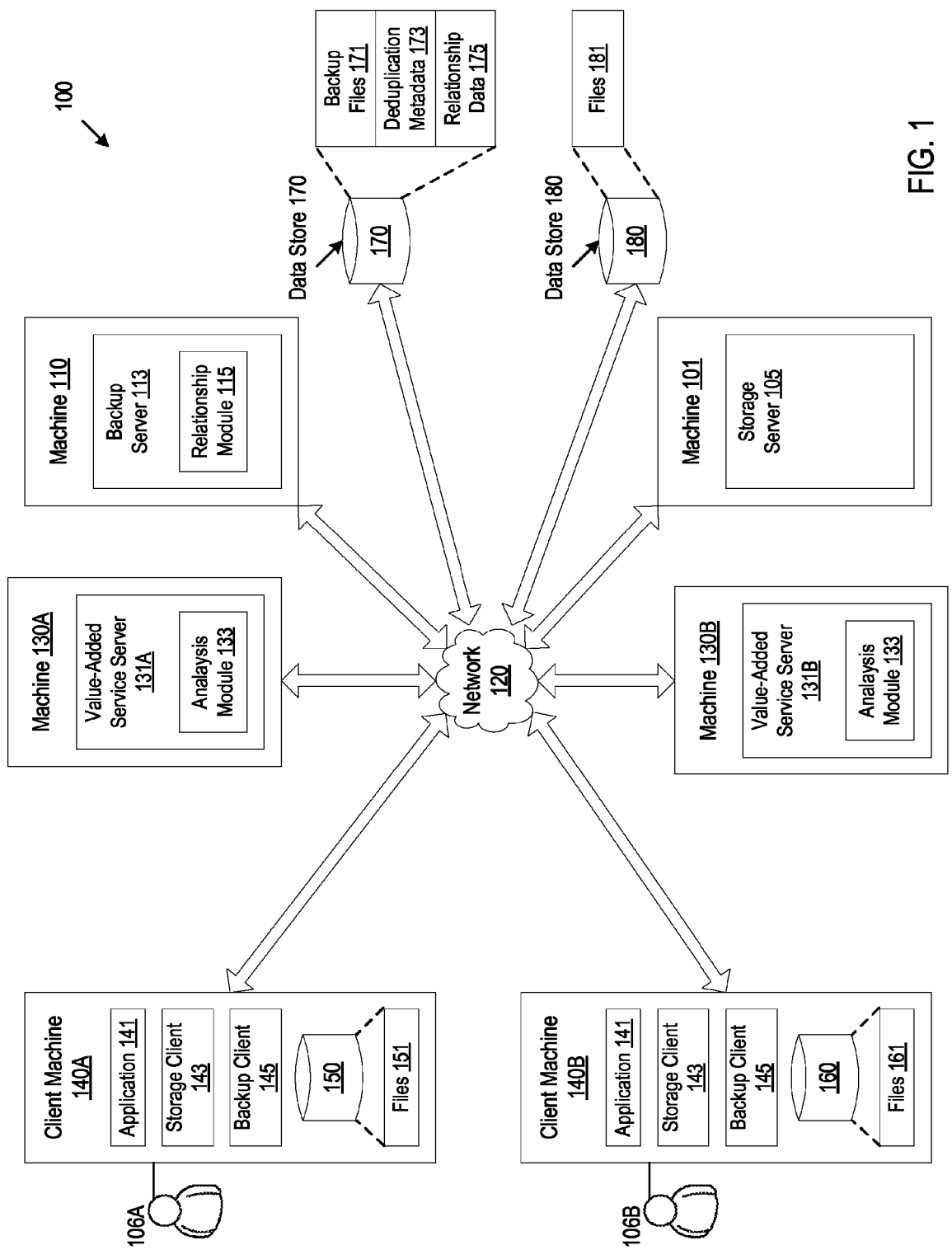
FIG. 1 illustrates example system architecture, in accordance with various implementations.

FIG. 1 is an example system architecture 100 in which implementations of the present disclosure can be implemented. The system architecture 100 can include one or more machines 101,110,130A-B and one or more client machines 140A-B connected via a network 120. The network 120 may be a public network, a private network, or a combination thereof.

The machines 101,110,130A-B can include, and are not limited to, any data processing device, such as a desktop computer, a laptop computer, a mainframe computer, a personal digital assistant, a server computer, a handheld device or any other device configured to process data. A client machine 140A-B can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

The client machines 140A-B can store data as files 151,161 in data stores 150,160 that are coupled to the client machines 140A-B. A data store 150,160 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The machine 101 can include a storage server 105 to store data as files 181 on storage devices (e.g., data stores) 180). The data stores 150,160,180 can include directories, which are virtual containers, in which groups of computer files 151,161, 181 and possibly other directories can be kept and organized. The data stores 170,180 may be mass storage devices, such as magnetic or optical storage based disks, solid-state drives (SSDs) or hard drives. In one implementation, the system architecture 100 includes a distributed file system that may be a network attached storage file system that includes one or more machines 101,110 and one or more data stores 170,180.

The storage server 105 can manage access to the files 181. The client machines 140A-B can host one or more applications 141, which may create or request access to the files 151,161,181. An application 141 can be any type of application including, for example, a web application, a desktop application, a browser application, etc. In one implementation, the application 141 may request access (e.g., read, write, etc.) to the files 181, for example, stored on data stores 180 in a file system, via a storage client 143 (e.g., file system client). One or more client machines 140A-B can include a storage client 143 to communicate with the storage server 105. The storage server 105 can handle requests from the storage clients 143 for access to the files 181.

The machine 110 can include a backup server 113 to create and manage backup files 171 of the files 151,161,181. The backup server 113 can communicate with a backup client 145 hosted on the client machines 140A-B to backup data 151,161 stored on the client machines 140A-B. The backup files 171 can be stored in one or more data stores 170 that are coupled to the backup server 113. The backup server 113 can perform data deduplication at the block level on the files 151,161,181 being backed up and can create block-level deduplication metadata 173. The block-based deduplication metadata 173 can include fingerprints that identify the content of the files 151,161,181 and can include information about the files 151, 161,181 such as, and not limited to, the owner (e.g., user 106A, user 106B) of the file, the machine (e.g., machine 140A-B,101) associated with the files, the data store (e.g., data store 150,160,180) where the file resides, when the file was created, the backups associated with the file, file metadata, data segment identifiers for the file, and other information.

The backup server 113 can include a relationship module 115 to discover relationships using the block-based deduplication metadata 173 and to create relationship data 175 that describes various types of relationships that are associated with the files 151,161,181. Examples of the relationships that are discovered can include, and are not limited to, relationships between users owning the files, hosts (e.g., machines) associated with the files, data segments (e.g., data blocks) of the files 151,161,181, backups for the files 151,161,181, etc. The relationship data 175 that is created from the discovered relationships can be used to provide a value-added service, such as, and not limited to, data loss protection (DLP), optimizing file/backup placement, forensic discovery, tracking of files for revocation purposes, etc.

The machines 130A-B can include a value-added service server 131A-B to provide value-added services. A value-added service (VAS) can be a non-core service. A value-added service can be made available, for example, to enhance a core service. For example, a core service may be an email service within an entity environment. An entity, as referred to herein, can represent any person, a business organization such as a corporation, an educational institution such as a college and university, etc. For brevity and simplicity, an Enterprise is used as an example of a business, corporation, and/or company throughout this document. The data of the Enterprise may include confidential data, such as, credit card numbers, bank account numbers, social security numbers, medical information, etc. For example, an Enterprise may implement a value-added server 131A within machine 130A to a DLP value-added service within the Enterprise environment to prevent the unauthorized transmission of confidential data. The value-added service server 131A can include an analysis module 133 to use the relationship data 175, which is created from discovering relationships using the block-level deduplication metadata 173, to implement the DLP service. For example, the analysis module 133 can use the relationship data 175 to identify relationships between files 151,161,181 at a deeper level of granularity. For example, a file named "File-A" may contain a social security number. The relationship module 115 may indicate that the Tar-1 contains File-1. The analysis module 133 may determine from the relationship data 175 that a compressed file named "Tar-1" contains File-1 without having to inspect the Tar-1 file. The value-added service server 131A may apply DLP policies to both File-1 and Tar-1 based on the relationship between Tar-1 and File-1.

In another example, the value-added service server 131A may provide a forensic discovery value-added service. There may be a confidential file called "File-2" that is shared between User-A and User-B. User-B may decide to store File-2 in a virtual image called "VM-1" that is offline, without User-A knowing. If the VM-1 is segmented, the deduplication metadata 173 can include block-based information for VM-1. The relationship module 115 may indicate that the VM-1 contains File-2. The analysis module 133 may determine from the relationship data 175 that VM-1 contains File-2 without having to unpack VM-1 and examine the contents of the image VM-1. The deduplication metadata 173 may include timestamp information. The relationship data 175 may indicated based on the timestamp information the information flow for File-2 from one user to another, For example, the analysis module 133 may determine from the relationship data 175 that User-A shared File-2 with User-B, but User-B stored File-2 in the virtual image VM-1.

In another example, an Enterprise may implement a value-added server 131B within machine 130B to provide a data governance service to provide data owner identification and visibility into data usage and access permissions. The value-added service server 131B can include an analysis module 133 to use the relationship data 175 that is based on the block-level deduplication metadata 173 to implement the data governance service.

Figure 2:
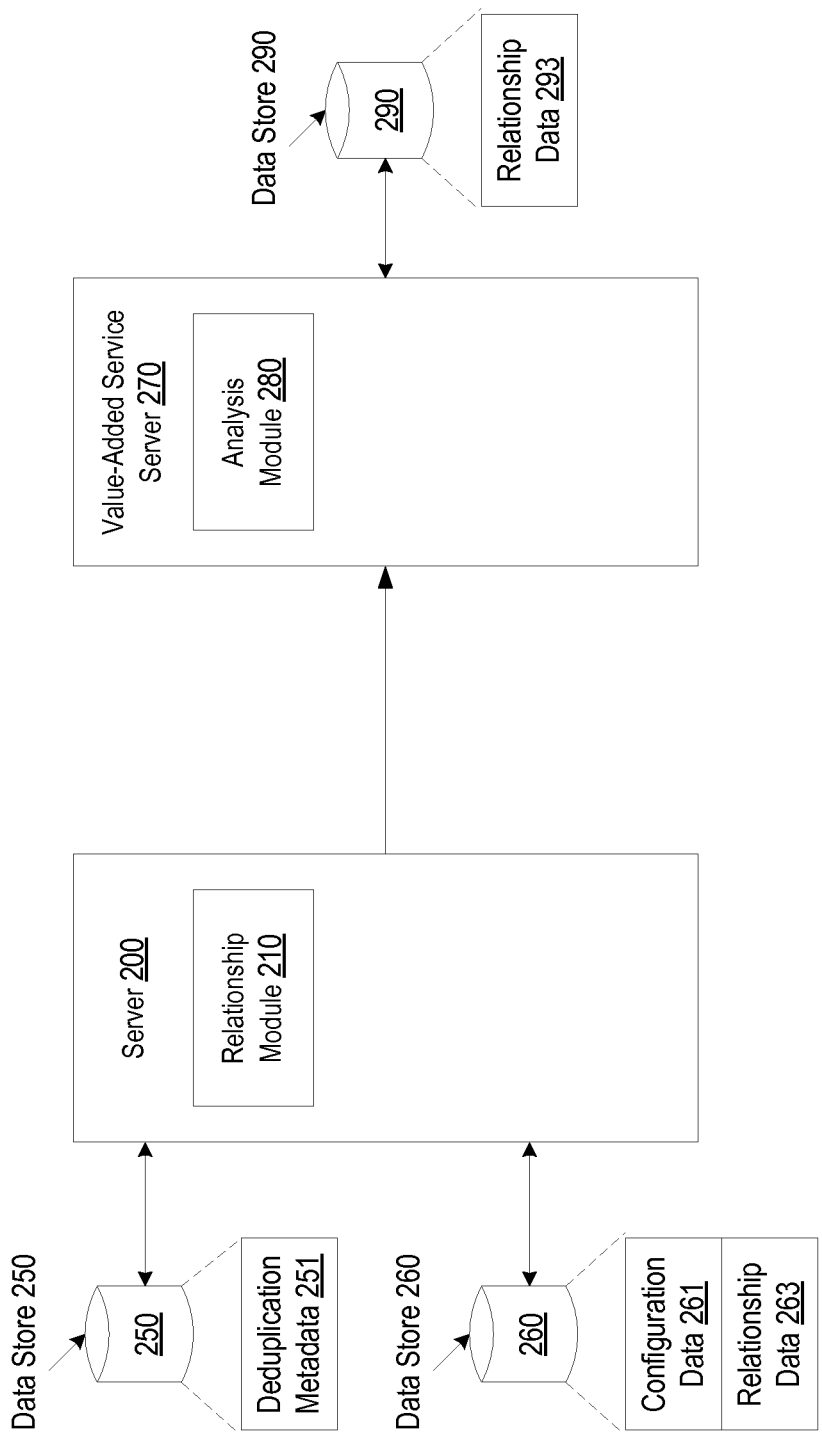
FIG. 2 is a block diagram of an implementation of a relationship module and an analysis module providing a value-added service using block-based deduplication metadata.

FIG. 2 is a block diagram of one implementation of a relationship module and an analysis module providing a value-added service using block-based deduplication metadata. The relationship module 210 may be the same as the relationship module 115 in a server (e.g., backup server 113) in a machine (e.g., machine 110) of FIG. 1. In one implementation, the server is a storage server (e.g., storage server 105 in machine 101 in FIG. 1) in a file system. The analysis module 280 may be the same as the analysis module 133 in a server (e.g., value-added service server 113) in a machine (e.g., machine 110) of FIG. 1. In one implementation, the relationship module 210 and the analysis module 280 reside in different servers and/or different machines. In another implementation, the relationship module 210 and the analysis module 280 reside in the same machine and/or the same server.

A server 200 (e.g., backup server, storage server) can include a relationship module 210 to create relationship data 263 from block-based deduplication metadata 251 that is stored in a data store 250 that is coupled to the server 200. The server 200 (e.g., backup server, storage server) can create the block-based deduplication metadata 251 when, for example, backing up data and/or storing data, for example, that resides in client machine, a file system, etc.

The types of data that can be stored in the block-based deduplication metadata 251 can correspond to a level in a data hierarchy. For example, for an individual file, the block-based deduplication metadata 251 can include the user that owns the file, the machine and/or data store (e.g., disk, volume, etc.) associated with the file, the backups associated with the file, file metadata, and the data segments (e.g., blocks) of the file. In one implementation, the block-based deduplication metadata 251 can include timestamps that correspond to the data at the various levels in the hierarchy. For example, the block-based deduplication metadata 251 can include a timestamp for when a user logged into and logged off of a machine, when the backup was made, when the file was created, when the file was changed, when the data segments were created, when the data segments were changed, etc. In one implementation, the data hierarchy includes a user level at the top of the data hierarchy, followed by a host level, a file level, a backup level, and a data unit (e.g., block) level at the bottom of the data hierarchy. In one implementation, the data hierarchy does not include a backup level. The relationship module 210 can crawl through various levels of data in the data hierarchy in the block-based deduplication metadata 251 to discover relationships that are associated with the files.

Figure 3:
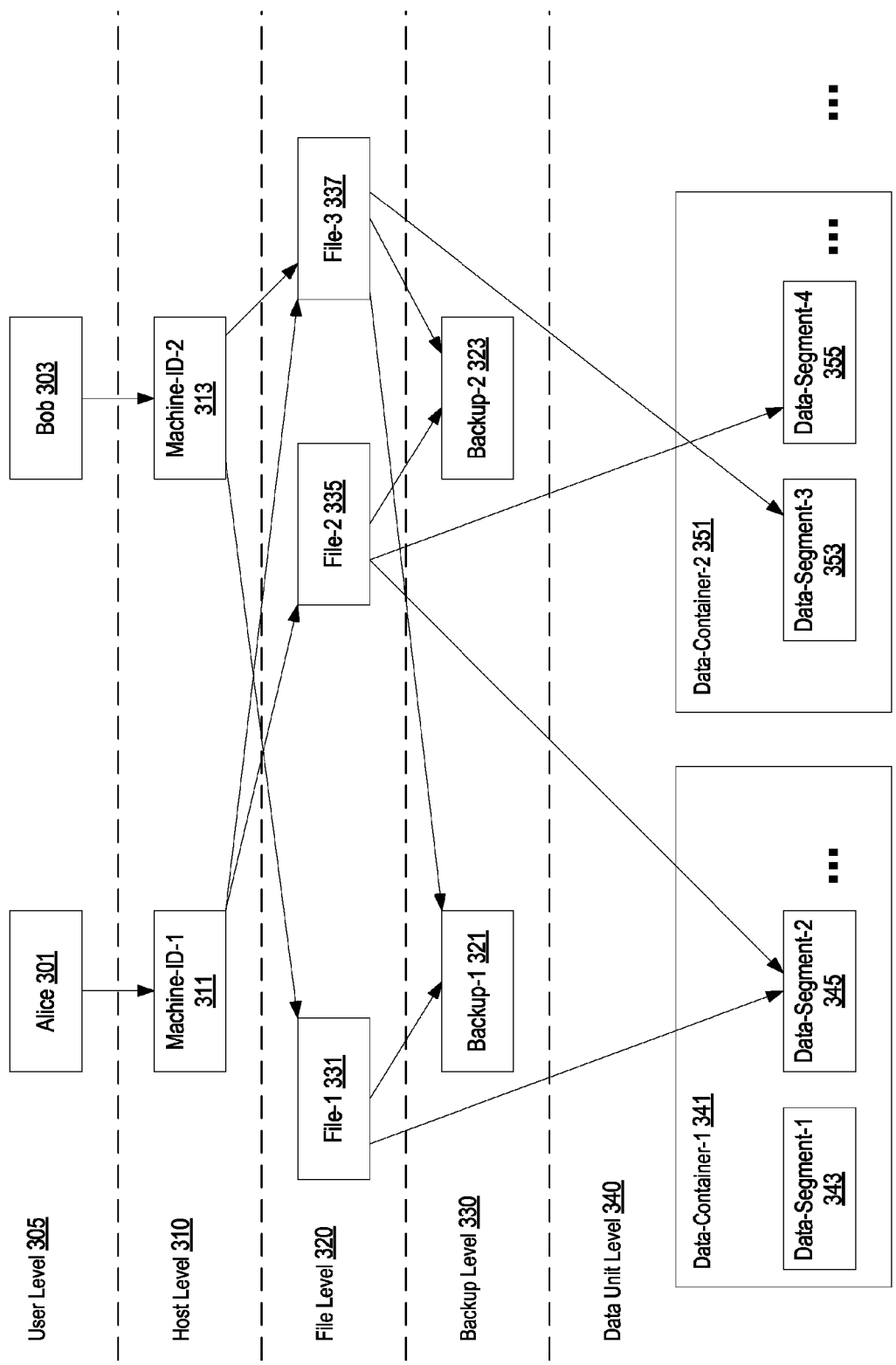
FIG. 3 is a block diagram illustrating example relationships described by the relationship data created by a relationship module from the block-based deduplication metadata.

FIG. 3 is a block diagram illustrating an example data hierarchy and example relationships described by the relationship data created by relationship module (e.g., relationship module 210 in FIG. 2) from the block-based deduplication metadata. The data hierarchy can include, for example, at the bottom level, a data unit (e.g., block) level 340, a backup level 330, a file level 320, a host level 310, and a user level 305. In one implementation, the data hierarchy does not include a backup level. For example, a file system may perform deduplication and create block-based deduplication metadata without backing up the data. The block-level deduplication metadata can include data that is associated with one or more levels. For example, the block-level deduplication metadata may include data describing that at the data unit level 340 there are two data containers 341,351. The data containers 341,351 can contain data segments. For example, the block-level deduplication metadata may include data describing that Data-Container-1 341 included data segments 343,345, and that Data-Container-2 352 includes data segments 353,355. The data segments can be blocks of data. The block-level deduplication metadata may include data describing that, at the file level 320, there may be File-1 331, File-2, and File-3 337. The block-level deduplication metadata may include data describing that, at the back up level 330, there may be Backup-1 321 and Backup-2 323. The block-level deduplication metadata may include data describing that, at the host level 310, there may be Machine-ID-1 311 and Machine-ID-2 313. The block-level deduplication metadata may include data describing that, at the user level 305, there may be users, Alice 301 and Bob 303.

The relationship module can discover from the block-level deduplication metadata the relationships that are associated with the files. For example, the relationship module may determine from the block-level deduplication metadata that Data-Segment-2 345 is being pointed to by File-1 331 and File-2 335, and that there is a relationship between File-1 331 and File-2 335 via Data-Segment-2 345. The relationship module may also determine that Backup-1 321 contains File-1 331 and File-3 337, and that Backup-2 323 contains File-2 335 and File-3 337. The relationship module may determine that there is a relationship between Backup-1 321 and Backup-2 323 via File-1 331, Data-Segment-2 345, and File-2 235. The relationship module may determine that there is a relationship between Backup-1 321 and Backup-2 323 via File-3 337. The relationship module can create and store relationship data to describe the relationships.

Returning to FIG. 2, the relationship module 210 can crawl through various levels of data in the block-based deduplication metadata 251 to discover relationships that are associated with the files. The block-based deduplication metadata can include data that describes which object (e.g., file, backup, machine, data store, user, etc.) is referencing a particular object. For example, the relationship module 210 may start at the file level, which includes information about which data segments (e.g., data block) the files are pointing to, to identify which files share data segments.

The relationship module 210 can crawl through the block-based deduplication metadata 251 up to the data that corresponds to the top of the data hierarchy and can determine relationships that correspond to the various data hierarchy levels. For example, the relationship module 210 can use the block-based deduplication metadata to enumerate the files that share data, can determine the backups which the files belong to, can determine which hosts (e.g., machines) are associated with the backups, and can determine which usernames and/or users are associated with the hosts.

In another example, the relationship module 210 may start at the top of the data hierarchy that includes information about usernames and may crawl down through the data hierarchy in the block-based deduplication metadata to identify which users are sharing which files with one another. The relationship module 210 can focus on a particular subset of a user's files. The usernames can be associated with users (e.g., Enterprise employees). For example, at the user level, the relationship module 210 may determine that there is a username that corresponds to a user "Alice" and a username that corresponds to a user "Bob". The relationship module 210 can crawl through the block-based deduplication metadata to the data at the host level, and may determine that Machine-ID-1 is associated with Alice and that Machine-ID-2 is associated with Bob. The relationship module 210 can crawl through the block-based deduplication metadata to the data at the file level, and may determine that Machine-ID-1 is associated with File-3 and that Machine-ID-2 is associated with File-3, which can indicate that Alice and Bob share File-3.

The relationship module 210 can store relationship data 263 indicating the various relationships associated with the data (e.g., files) that are being backed up by a backup server and/or stored by a storage server. The relationship data 263 can be stored in a data store 260 that is coupled to the relationship module 210. The relationship data 263 can be stored as a relational database, spreadsheet, flat file, etc.

The relationship module 210 can update the relationship data 263. The updates can be made periodically based on, for example, configuration data 261 that is stored in the data store 260. For example, the configuration data 261 may specify that the relationship module 210 should update the relationship data 263 when new block-based deduplication metadata is generated. The configuration data 261 can be user-defined. For example, a system administrator may provide user input for the configuration data 261.

The relationship module 210 can send the relationship data 263 to one or more value-added service servers 270. The relationship module 210 may receive a request for the relationship data 263 from a value-added service server 270. A value-added service server 270 can include an analysis module 280 to provide a value-added service using the relationship data that is based on the block-based deduplication metadata. Examples of value-added services can include, and are not limited to, a data loss protection (DLP) service, a data governance service, a discovery service, an auditing service, a forensic service, etc.

The analysis module 280 can store the relationship data 293 in a data store 290 that is coupled to the analysis module 280. The analysis module 280 can use the relationship data 293 to determine relationships offline. The analysis module 280 does not need to analyze all of the data in real-time. For example, the analysis module 280 can use the relationship data 293 to identify data (e.g., files, file content) that has been contained within other file formats or encapsulations, such as, and not limited to, virtual machine (VM) images and tar archives without having to actually examine the VM images and tar archives. For example, if data (e.g., files, file content) has been duplicated in two VM images, the analysis module 280 can use the relationship data 293 to detect the existence of duplicated data. For example, the analysis module 280 may provide a DLP service and may be configured to prevent unauthorized users from accessing files that have sensitive data. The analysis module 280 may determine that File-1 contains sensitive. When an unauthorized user wishes to access a virtual machine image "VM-Image-1", the analysis module 280 may quickly determine from the relationship data 293 that VM-Image-1 contains File-1, and can prevent the user from accessing VM-Image-1 based on the relationship between VM-Image-1 and File-1 without having the analysis module 280 have to actually inspect the content of VM-Image-1. When an unauthorized user wishes to access another virtual image, such as VM-Image-2, the analysis module 280 may quickly determine from the relationship data 293 that VM-Image-2 also contains File-1, and can prevent the user from accessing VM-Image-2 without having the analysis module 280 have to actually inspect the content of VM-Image-2.

The analysis module 280 can use the relationship data 293 to improve DLP performance. For example, the analysis module 280 can use the relationship data 293 to reduce the performance overhead of the file scanning components of the value-added service server 270. In one implementation, analysis module 280 tracks when a data block was processed to determine whether the data block satisfies criterion for providing the value-added service. For example, for a DLP value-added service, the analysis module 280 can process File-1 to determine whether File-1 contains sensitive data and can create tracking data to indicate whether the data blocks of File-1 have been processed or not. The analysis module 280 can apply the tracking data that has been stored for the data blocks of File-1 to the other files that share the same data blocks of File-1. The analysis module 280 can use the tracking data to reduce the number of files that need to be processed.

In another example, the analysis module 280 may use the relationship data 293 to determine user data access behavior and information sharing patterns, which may provide additional tools for a data governance value-added service regarding file access and permission recommendations. For example, the analysis module 280 may determine that user Alice created a backup with File-1 yesterday, and that user Bob created a backup yesterday that did not include File-1. The analysis module 280 may determine that user Alice created a backup with File-1 today, and that user Bob created a backup today that also includes File-1. The analysis module 280 can determine that user Alice shared File-1 with user Bob. The analysis module 280 can use the relationship data 293 to manage policies (e.g., security policies, access policies) related to the value-added services. For example, the analysis module 280 may use the relationship data 293 to restrict the file access on File-1.

The analysis module 280 can use the relationship data 293 to track information leaks and/or file leaks. For example, if multiple copies of a file were made and one of those copies was leaked, the analysis module 280 can track the files with similar content and determine which users accessed the leaked file and the copies.

In one implementation, the relationship data 293 describes relationships based on one or more timestamps that are in the block-based deduplication metadata 251. In one implementation, the block-based deduplication metadata 251 can include timestamps that correspond to the data at the various levels in the hierarchy. For example, the block-based deduplication metadata 251 can include a timestamp for when a user logged into and logged off of a machine, when the backup was made, when the file was created, when the file was changed, when the data segments were created, when the data segments were changed, etc. The analysis module 280 can use the relationship data 293 to determine a temporal ordering of events and references (e.g., pointers). For example, the analysis module 280 may determine which user shared data with other users. The analysis module 280 can use the temporal ordering of events, for example, in value-added services (e.g., DLP services, data governance services, etc.).

A data store 250,260,290 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 4:
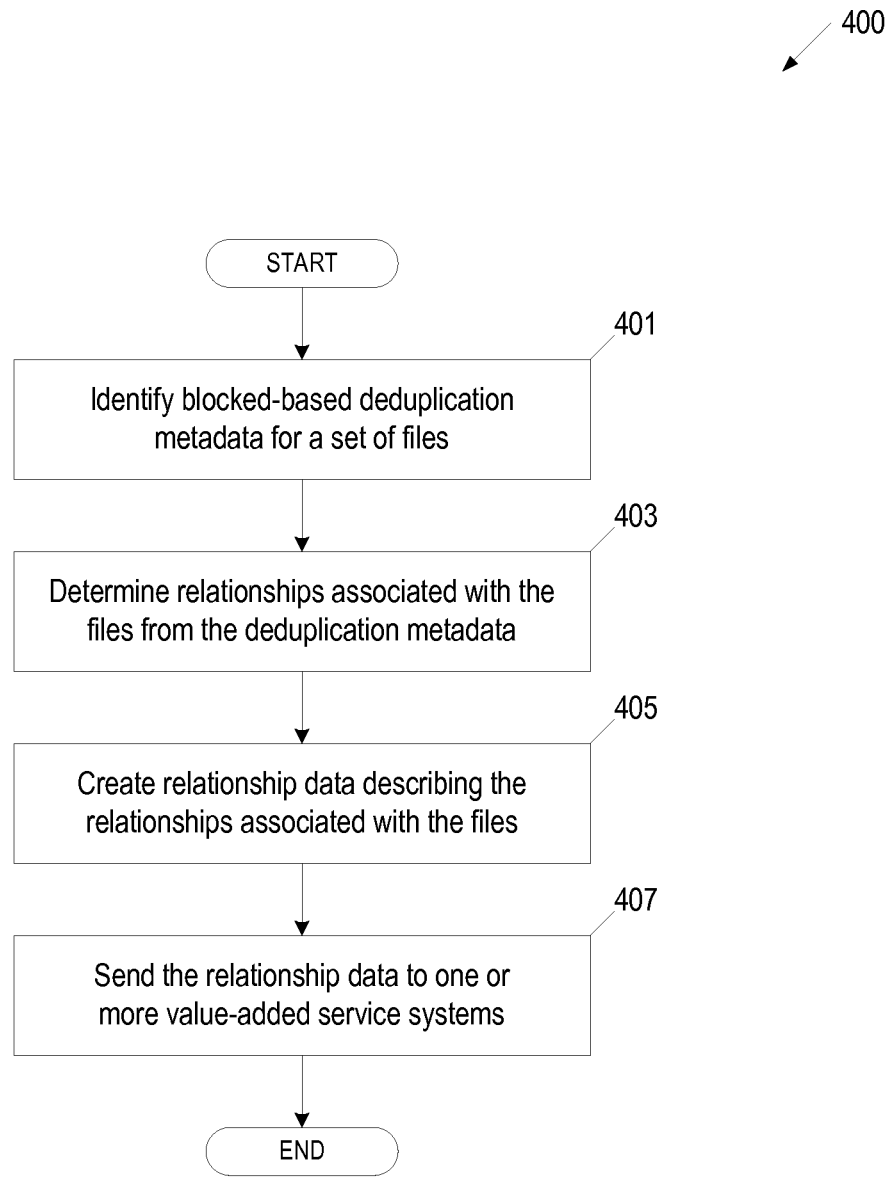
FIG. 4 is a flow diagram illustrating an implementation for a method for discovering relationships and creating relationship data from block-based deduplication metadata for providing a value-added service.

FIG. 4 is a flow diagram of an implementation of a method 400 for discovering relationships and creating relationship data from block-based deduplication metadata for providing a value-added service. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a relationship module 115 in a server (e.g., backup server 113) in a machine (e.g., machine 110) of FIG. 1.

At block 401, the server identifies block-based deduplication metadata for data set of files. In one implementation, the server creates the block-based deduplication metadata by performing a deduplication process on the files that are being backed up by the server. The deduplication can occur at the block level. At block 403, the server determines relationships associated with the files from the block-based deduplication metadata. For example, the server can determine which files share data. For example, the server can examine the pointers for the files in the block-based deduplication metadata to determine which data segments (e.g., data blocks) the pointers are pointing to. In one implementation, the server can determine an address which a pointer is pointing to and can determine which files are pointing to the same address. In one implementation, the server can perform a de-referencing operation to determine which data block a pointer is pointing to. For example, the server may determine that "File-1" and "File-2" are pointing the same block "Data-Segment-2".

In one implementation, the server further determines which backups are associated with the files (e.g., File-1, File-2, File-3). For example, the server can examine entries in the block-based deduplication metadata for the files (e.g., File-1, File-2, File-3), which can contain backup identifiers for the backups that are associated with the files. For example, File-1 may be associated with Backup-1, File-2, and File-3 may be associated with Backup-2. In one implementation, the server further determines which machine is associated with which file. For example, the server can examine entries in the block-based deduplication metadata for the files, which can contain a machine identifier for the machine that hosts the file. For example, File-1 may be associated with Machine-ID-2, and File-2 and File-3 may be associated with Machine-ID-1. In one implementation, the server further determines which user is associated with which machine. For example, the server can examine entries in the block-based deduplication metadata for the files, which can contain a user identifier for the user that may have logged into the machine. For example, Machine-ID-1 may be associated with user "Alice," and that Machine-ID-2 may be associated with user "Bob". Examples of a user identifier can include, and are not limited to, a username, a user's first name and/or last name, an employee identifier, etc.

At block 405, the server creates relationship data that describes the relationships that are associated with the files. The relationship data can describe one or more relationships associated with one or more files. For example, the relationship data can describe that File-1 and File-2 share Data-Segment-2. In another example, the relationship data can include timestamps. For example, the relationship data can include timestamps for backups. The relationship data can describe that a backup made on Day-1 of the machine being used by Alice included the File-1 and that a backup made on Day-1 for the machine being used by Bob did not include File-1. The relationship data can describe that a backup made on Day-2 of the machine being used by Alice included the File-1 and that a backup made on Day-2 for the machine being used by Bob also included File-1.

At block 407, the server sends the relationship data to one or more value-added service systems. In one implementation, the server receives a request for the relationship data from a value-added service server. In one implementation, the server sends the relationship data to the value-added service system via a network. For example, the server may be a backup server and may send the relationship data to a data loss protection server in a value-added service system via a network. The value-added service server (e.g., data loss protection server) can use the relationship data to provide a value-added service. One implementation of a value-added service server providing a value-added service using the relationship data is described in greater detail below in conjunction with FIG. 5.

Figure 5:
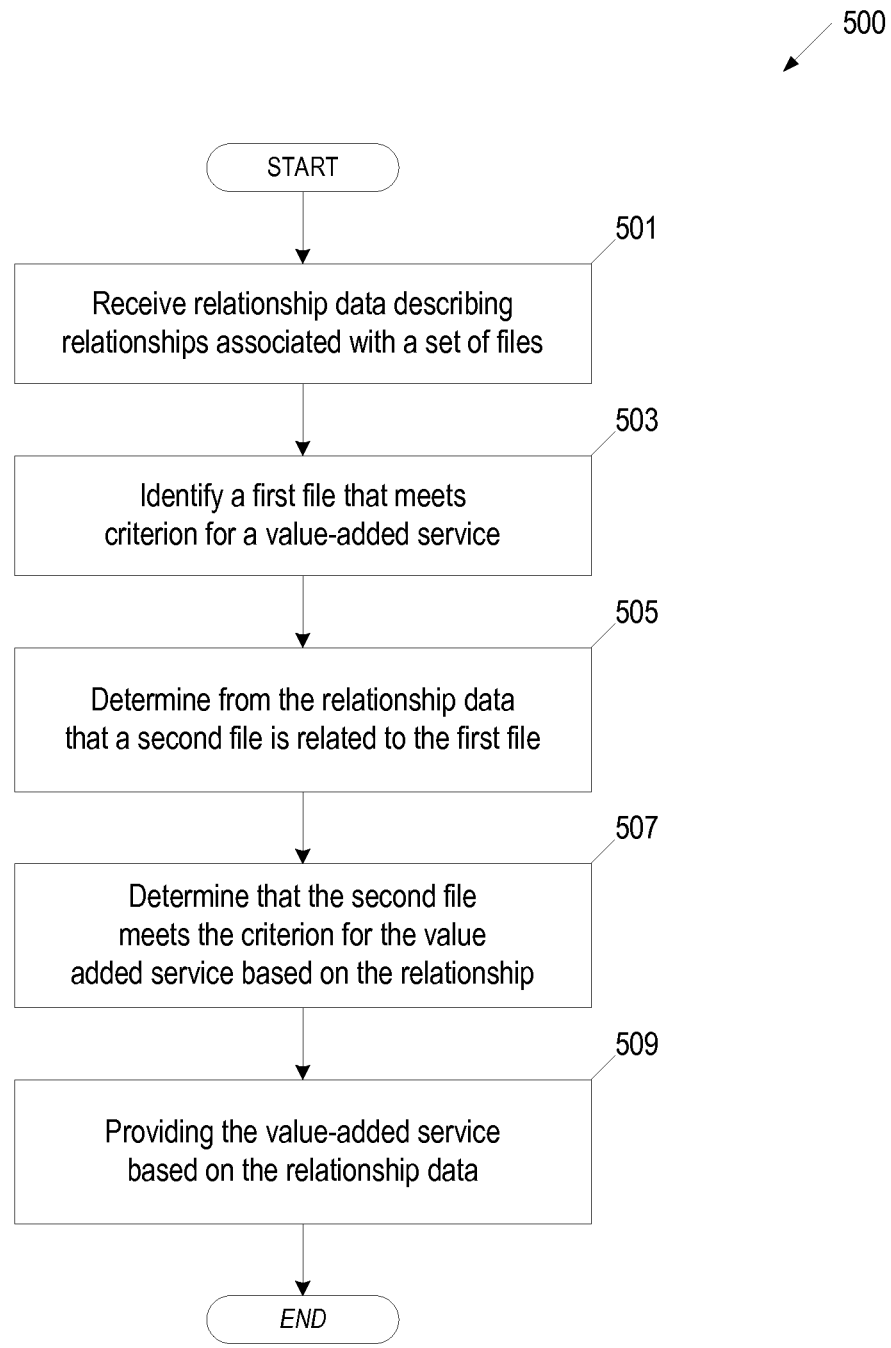
FIG. 5 is a flow diagram illustrating an implementation for a method for providing a value-added service based on relationships discovered from block-based deduplication metadata.

FIG. 5 is a flow diagram of an implementation of a method 500 for providing a value-added service based on relationships discovered from block-based deduplication metadata. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by an analysis module 133 in a server (e.g., value-added service server 131) in a machine (e.g., machine 130A-B) of FIG. 1.

At block 501, the server receives relationship data for files. In one implementation, the server receives the relationship data from a backup server. In one implementation, the server receives the relationship data from a storage server in a file system. In one implementation, the server receives the relationship data via a network. At block 503, the server identifies a first file that meets criterion for a value-added service. For example, the value-added service may be a data loss protection (DLP) service that prevents data to be protected (e.g., confidential data) from being transmitted without redacting the confidential data. For example, a criterion for a DLP value-added service may be that a file contains confidential data. For example, the server may identify that a file "Customer-Credit-Data" contains confidential data (e.g., credit card numbers), which satisfies criterion for the DLP value-added service.

At block 505, the server determines from the relationship data that a second file is related to the first file. For example, the relationship data may indicate that another file "Customer-Payment-Data" shares data that is in the file "Customer-Credit-Data". For example, the credit card numbers in the file "Customer-Credit-Data" may also be in the file "Customer-Payment-Data". At block 507, the server determines that the second file meets the criterion for the value-added service and provides the value-added service based on the relationship data at block 509. For example, the server may apply a policy at block 509 to provide the value-added service. For example, the policy for a DLP value-added service may be that when the criterion is satisfied, the confidential data should be redacted in a file. For example, the server determines that the file "Customer-Payment-Data" shares data, which is confidential data, with the file "Customer-Credit-Data" and redacts the credit card numbers in the file "Customer-Credit-Data" and in the file "Customer-Payment-Data".

Figure 6:
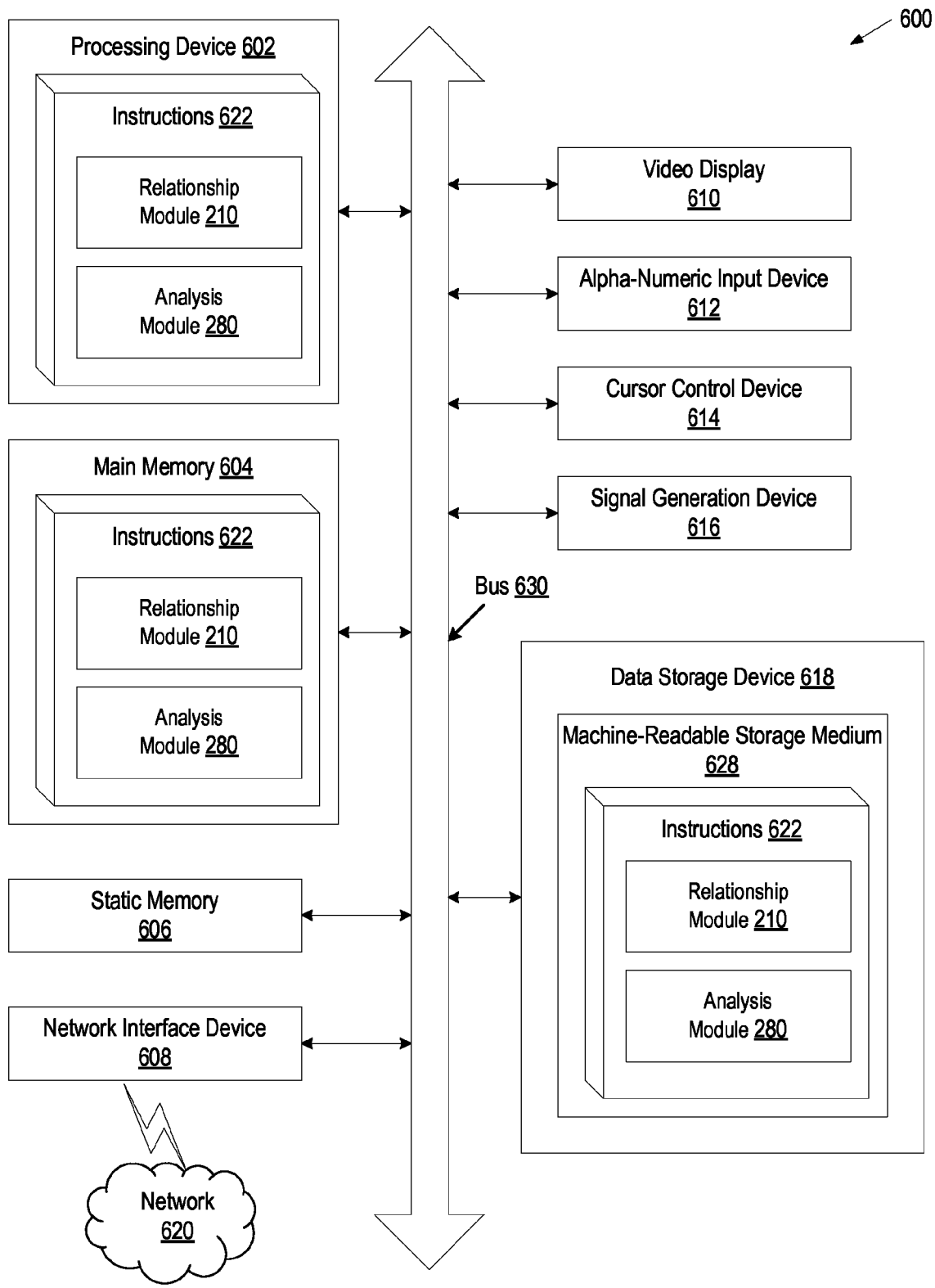
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions 622 or software embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a relationship module (e.g., relationship module 210 of FIG. 2) and/or an analysis module (e.g., analysis module 280 of FIG. 2) and/or a software library containing methods that call modules in a relationship module and/or an analysis module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   identifying deduplication metadata for a plurality of files, wherein the deduplication metadata comprises block level information for the plurality of files;
   examining, by a first computer system, the deduplication metadata to discover a plurality of levels of relationships associated with the plurality of files based on at least the block level information;
   creating relationship data describing the plurality of levels of relationships, wherein the plurality of levels comprises a level describing relationships between users of host machines that are used to access respective files; and
   sending the relationship data describing the plurality of levels of relationships associated with the plurality of files to a second computer system providing a data loss protection service to cause a data loss protection operation to be performed based on the relationship data,
   wherein examining the deduplication metadata comprises identifying files that are pointing to a same data segment, identifying host machines that are used to access the files that point to the same data segments, and identifying respective users that are associated with the host machines that are accessing the files.

2. The method of claim 1, wherein the plurality of files comprises at least one of a virtual machine image, compressed data, or archived data.

3. The method of claim 1, wherein the first computer system comprises a data storage backup system.

4. The method of claim 1, further comprising:
   sending the relationship data to at least one of a discovery system, a data governance system, an auditing system, or a forensic system.

5. The method of claim 1, wherein to cause the data loss protection operation to be performed based on the relationship data comprises:
   identifying a first file of the plurality of files, the first file satisfying criterion of the data loss protection service;
   identifying, from the relationship data, a second file of the plurality of files being related to the first file; and
   determining that the second file satisfies the criterion of the data loss protection service based on the second file being related to the first file.

6. A system comprising:
   a computer system comprising:
      a memory; and
      a processing device coupled with the memory to:
         identify deduplication metadata for a plurality of files, the deduplication metadata comprises block level information for the plurality of files;
         examine the deduplication metadata to discover a plurality of levels of relationships associated with the plurality of files based on at least the block level information;
         create relationship data describing the plurality of levels of relationships, wherein the plurality of levels comprises a level describing relationships between users of host machines that are used to access respective files; and
         send the relationship data describing the plurality of levels of relationships associated with the plurality of files to a second computer system providing a data loss protection service to cause a data loss protection operation to be performed based on the relationship data,
         wherein examining the deduplication metadata comprises identifying files that are pointing to a same data segment, identifying host machines that are used to access the files that point to the same data segments, and identifying respective users that are associated with the host machines that are accessing the files.

7. The system of claim 6, wherein the plurality of files comprises at least one of a virtual machine image, compressed data, or archived data.

8. The system of claim 6, wherein the computer system comprises a data storage backup system.

9. The system of claim 6, wherein the processing device is further to:
   send the relationship data to at least one of a discovery system, a data governance system, an auditing system, or a forensic system.

10. The system of claim 6, wherein to cause the data loss protection operation to be performed based on the relationship data, the processing device is to:
- identify a first file of the plurality of files, the first file satisfying criterion of the data loss protection service;
- identify, from the relationship data, a second file of the plurality of files being related to the first file; and
- determine that the second file satisfies the criterion of the data loss protection service based on the second file being related to the first file.

11. A non-transitory computer readable storage medium including instructions that, when executed by a processing device on a first computer system, cause the processing device to perform operations comprising:
- identifying deduplication metadata for a plurality of files, wherein the deduplication metadata comprises block level information for the plurality of files;
- examining, by the processing device, the deduplication metadata to discover a plurality of levels of relationships associated with the plurality of files based on at least the block level information;
- creating relationship data describing the plurality of levels of relationships, wherein the plurality of levels comprises a level describing relationships between users of host machines that are used to access respective files; and
- sending the relationship data describing the plurality of levels of relationships associated with the plurality of files to a second computer system providing a data loss protection service to cause a data loss protection operation to be performed based on the relationship data,
- wherein examining the deduplication metadata comprises identifying files that are pointing to a same data segment, identifying host machines that are used to access the files that point to the same data segments, and identifying respective users that are associated with the host machines that are accessing the files.

12. The non-transitory computer readable storage medium of claim 11, wherein the plurality of files comprises at least one of a virtual machine image, compressed data, or archived data.

13. The non-transitory computer readable storage medium of claim 11, wherein the first computer system comprises a data storage backup system.

14. The non-transitory computer readable storage medium of claim 11, the operations further comprising:
- sending the relationship data to at least one of a discovery server, a data governance server, an auditing server, or a forensic server.

15. The non-transitory computer readable storage medium of claim 11, wherein the second processing device is to:
- identify a first file of the plurality of files, the first file satisfying criterion of the data loss protection service;
- identify, from the relationship data, a second file of the plurality of files being related to the first file; and
- determine that the second file satisfies the criterion of the data loss protection service based on the second file being related to the first file.

* * * * *